(12) United States Patent
Christo et al.

(10) Patent No.: US 10,671,792 B2
(45) Date of Patent: Jun. 2, 2020

(54) IDENTIFYING AND RESOLVING ISSUES WITH PLATED THROUGH VIAS IN VOLTAGE DIVIDER REGIONS

(71) Applicant: International Business Machines Corporation, Armonk, NY (US)

(72) Inventors: Michael A. Christo, Round Rock, TX (US); David L. Green, Austin, TX (US); Julio A. Maldonado, Austin, TX (US); Diana D. Zurovetz, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/048,304

(22) Filed: Jul. 29, 2018

(65) Prior Publication Data
US 2020/0034510 A1    Jan. 30, 2020

(51) Int. Cl.
*G06F 30/398*    (2020.01)

(52) U.S. Cl.
CPC ................. *G06F 30/398* (2020.01)

(58) Field of Classification Search
CPC .................................. G06F 17/5081
USPC ........................................ 716/112
See application file for complete search history.

(56) References Cited

U.S. PATENT DOCUMENTS

| | | | | |
|---|---|---|---|---|
| 6,529,913 B1* | 3/2003 | Doig | ........ | G06F 17/50 716/102 |
| 6,691,296 B1* | 2/2004 | Nakayama | ........ | G06F 17/5036 716/122 |
| 6,892,368 B2 | 5/2005 | Li et al. | | |
| 6,895,568 B2 | 5/2005 | Li | | |
| 6,976,233 B1* | 12/2005 | Frank | ........ | G06F 17/5018 716/112 |
| 7,080,329 B1* | 7/2006 | Teig | ........ | G06F 17/5068 716/122 |
| 7,096,447 B1* | 8/2006 | Li | ........ | G06F 17/5081 716/112 |
| 7,640,523 B1* | 12/2009 | Shi | ........ | G06F 17/5077 703/13 |
| 7,805,689 B2 | 9/2010 | Ueda et al. | | |
| 7,925,999 B2 | 4/2011 | Lai et al. | | |
| 9,265,155 B2 | 2/2016 | Bartley et al. | | |
| 9,881,119 B1* | 1/2018 | Kukal | ........ | G06F 17/5036 |
| 10,231,325 B1* | 3/2019 | Chengson | ........ | H05K 1/116 |
| 2004/0040008 A1* | 2/2004 | Ahrikencheikh | ... | G06F 17/5068 716/122 |
| 2005/0190959 A1* | 9/2005 | Kohler | ........ | G01R 31/2813 382/147 |

(Continued)

*Primary Examiner* — Suresh Memula
(74) *Attorney, Agent, or Firm* — Jay Wahlquist

(57) ABSTRACT

Identifying and resolving issues with placement of plated through vias in voltage divider regions of a printed circuit board ("PCB") layout. Search parameters indicate an area of the PCB layout to be analyzed, and vias meeting the search parameters are evaluated for placement issues. Upon detecting a placement issue for a via, a solution is determined that addresses and resolves the placement issue of the via. The resolution in an embodiment includes modifying an adjacent power shape, modifying a region between shapes, and/or modifying via placement to minimize risks that include potential shorting, partially-connected vias, and/or poor plated barrel adhesion.

19 Claims, 13 Drawing Sheets

(56) References Cited

U.S. PATENT DOCUMENTS

| | | | |
|---|---|---|---|
| 2008/0072203 A1* | 3/2008 | Bergman Reuter | ......................... G06F 17/5072 716/122 |
| 2009/0034833 A1* | 2/2009 | Ozaki | ................... G03F 9/7088 382/149 |
| 2009/0077523 A1* | 3/2009 | Jiang | ................... G06F 17/5072 716/130 |
| 2009/0172618 A1* | 7/2009 | Fujimori | ............. G06F 17/5036 716/106 |
| 2010/0289150 A1* | 11/2010 | Hamanaka | .......... G06F 17/5077 257/773 |
| 2011/0107284 A1 | 5/2011 | Owa | |
| 2012/0192140 A1* | 7/2012 | Sadamatsu | .......... G06F 17/5031 716/137 |
| 2012/0304142 A1* | 11/2012 | Morimoto | ........... G06F 17/5045 716/119 |
| 2012/0331435 A1* | 12/2012 | Rahman | .............. H01L 25/0655 716/120 |
| 2013/0055190 A1* | 2/2013 | Wu | ..................... G06F 17/5081 716/136 |
| 2013/0268908 A1* | 10/2013 | Arelt | ................... G06F 17/5068 716/122 |
| 2016/0063166 A1 | 3/2016 | Hsieh et al. | |
| 2016/0342723 A1 | 11/2016 | Chen et al. | |
| 2016/0342724 A1* | 11/2016 | Chen | ................... G06F 17/5072 |
| 2016/0371416 A1* | 12/2016 | Chun | ................... G06F 17/5077 |
| 2017/0316139 A1* | 11/2017 | Chun | ................... G06F 17/5072 |
| 2019/0087524 A1* | 3/2019 | Brown | ................ G06F 17/5077 |

* cited by examiner

US 10,671,792 B2

IDENTIFYING AND RESOLVING ISSUES WITH PLATED THROUGH VIAS IN VOLTAGE DIVIDER REGIONS

BACKGROUND

The present invention relates to plated through vias in voltage divider regions of a printed circuit board ("PCB"), and more particularly to identifying and resolving issues with placement thereof.

A via is an electrical connection between layers of a printed circuit board ("PCB"). A through via is formed by creating a hole through the layers of the PCB, for example by drilling or through use of a laser. A plated through via ("PTV"), sometimes referred to as a plated through hole ("PTH"), is a via that connects pads placed in corresponding positions on layers of the PCB electrically, for example by electroplating or by filling the drilled hole with a conductive tube that is commonly referred to as a "barrel".

SUMMARY

The present invention is directed to identifying and resolving placement issues of plated through vias in voltage divider regions. In an embodiment, an algorithmic evaluation is performed. An embodiment comprises: obtaining search parameters for identifying via placement issues in a printed circuit board ("PCB") layout; identifying one or more via placement issues in the PCB layout specification, according to the obtained search parameters; resolving each of the one or more identified via placement issues, using a resolution selected from a predetermined set of resolutions; and revising the PCB layout to store an updated PCB layout in which the one or more identified via placement issues are resolved.

An embodiment is provided by augmenting a PCB design tool with code providing an implementation of the algorithmic evaluation or a call-out to such code. In another embodiment, the algorithmic evaluation is performed by an application that is embodied separately from the PCB design tool, whereby input to the algorithmic evaluator application uses layout information created from the PCB design tool.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION

Figure 1:
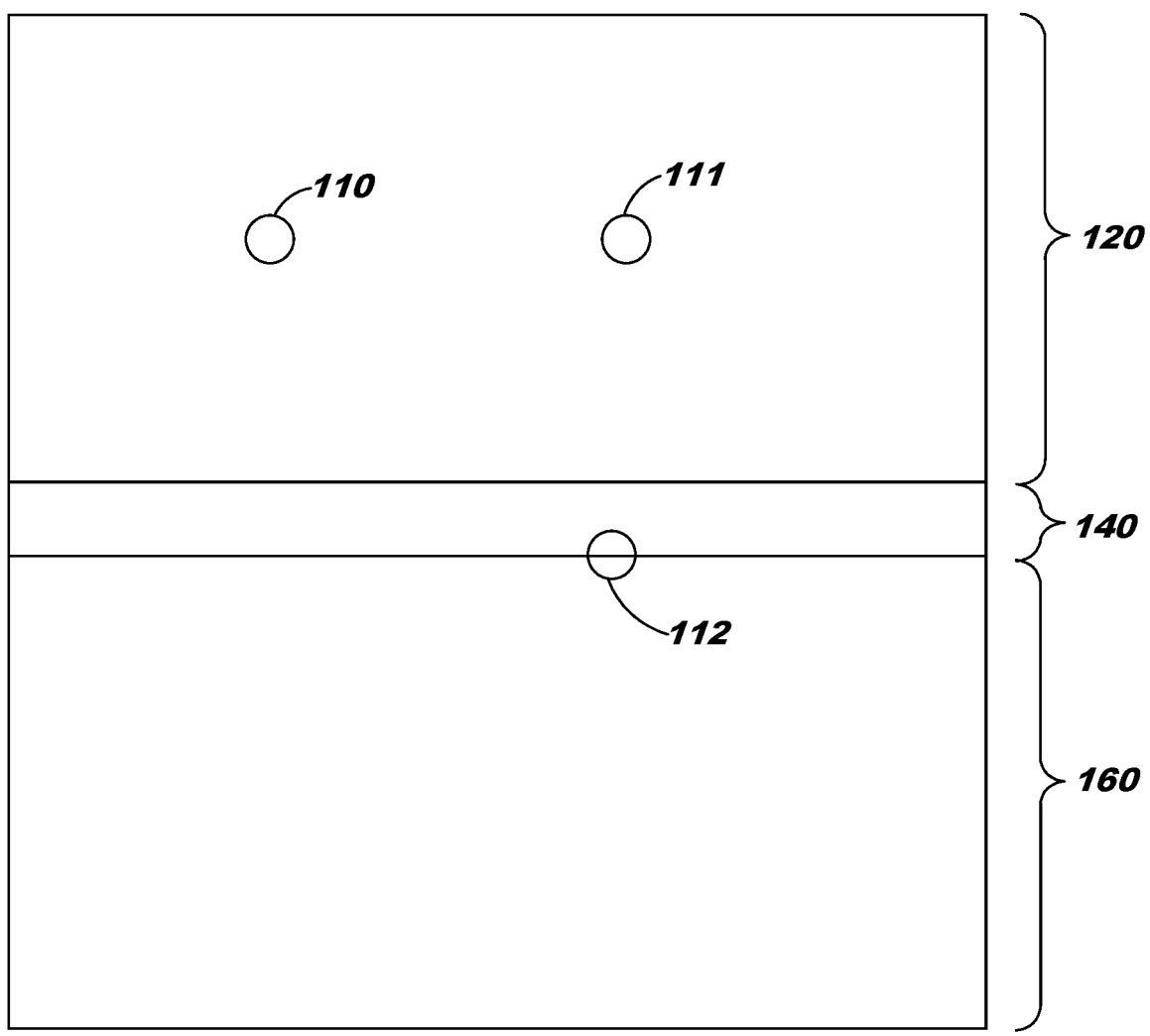
FIG. 1 illustrates a view of a layer of a PCB, showing one type of via placement issue that may arise.

Embodiments of the present invention are directed toward plated through vias in voltage divider regions, and more particularly to identifying and resolving issues with placement thereof. An existing automated PCB design and layout tool, examples of which include an electronic design automation ("EDA") tool or a computer-aided design ("CAD") tool, designs a PCB layout by simulated placement of various components on layers of the PCB. (For ease of reference, an EDA tool or CAD tool is referred to herein as a "PCB design tool"). A PCB typically includes conductive layers and non-conductive layers to insulate the conductive layers from each other. Some of the conductive layers are typically designated as power layers (i.e., layers having positive or negative voltages, or ground layers) while others of the conductive layers are typically designated as signal layers. Detailed information is gathered as the PCB design tool operates, including (but not limited to) the size of each component, its physical location on a layer, and the size of spaces around the component, as is known to those of skill in the art. As is readily understood, the simulated layout of PCB layers is often a dynamic process whereby footprints for components are placed in a location, perhaps moved to a different location, connections among components are designated, and so forth; when completed, the simulated design as created with a PCB design tool is submitted for fabrication of the actual PCB.

As the density of PCBs increases, the number of vias and number of signals located on each layer also increase. Because of this, there are often locations on the PCB where vias are located between two power planes or are located on the edge of a power plane that is immediately adjacent to another power plane. Via placement on densely-populated layers raises concerns about potential shorting, partially-connected vias, and poor plated barrel adhesion. When using an existing approach, such concerns will typically delay the start of the physical building of the PCB from its simulated design, pending evaluation as to how likely the potential problems are to occur and then manually attempting to find a suitable resolution. In one existing approach, issue resolution involves a designer manually modifying the so-called "Gerber data" for the already-simulated PCB, which tends to be a risky operation, as the rework of the design in this manner may introduce additional problems. (As is readily understood, Gerber data is created as output of a PCB design tool to represent the simulated component placement for a PCB, and is provided as input for the physical fabrication of the PCB. The term "Gerber" refers to a particular format that is the de facto standard for such data.)

Existing techniques for evaluation and resolution of issues with via placement require study by engineers, which requires devoting additional resources to the project. Accordingly, in addition to the above-noted project delays and potential for introducing additional problems into the Gerber data, project costs are highly likely to increase.

During a typical PCB design process, the designer will often manually separate adjacent power planes, thereby taking care to avoid the placement of vias between the power planes. However, it is relatively common for through vias to be added late in the design phase, or for the power shape boundary to be modified, both of which may result in a via falling into a divider region between power planes/shapes. These layout issues with divider regions may also occur simply due to oversight by the designer.

FIG. 1 illustrates a birds-eye (i.e., top-down) view of a layer of a PCB, showing one type of via placement issue that may arise. In this example, the PCB includes 3 vias 110, 111, 112. A layout issue exists with via 112, in that via 112 is partially connected to the ground ("GND") plane 160 and sits in a void 140 between the GND plane 160 and an adjacent voltage plane 120. (As used herein, the term "void" refers to an area void of copper within a shape or between two shapes that are located on the same plane or layer.)

An embodiment of the present invention is directed to evaluating via placement to identify plated through vias that are located in voltage divider regions, and upon detecting a placement issue, resolving that issue programmatically, without requiring the designer to manually determine a resolution. As will be discussed in further detail, the resolution in an embodiment includes modifying an adjacent power shape, modifying a region between shapes, and/or modifying via placement to minimize risks that include the above-noted potential shorting, partially-connected vias, and/or poor plated barrel adhesion. Because an embodiment evaluates via(s) located in a voltage divider region, a via of interest is also referred to herein as a "via-in-void".

Figure 2:
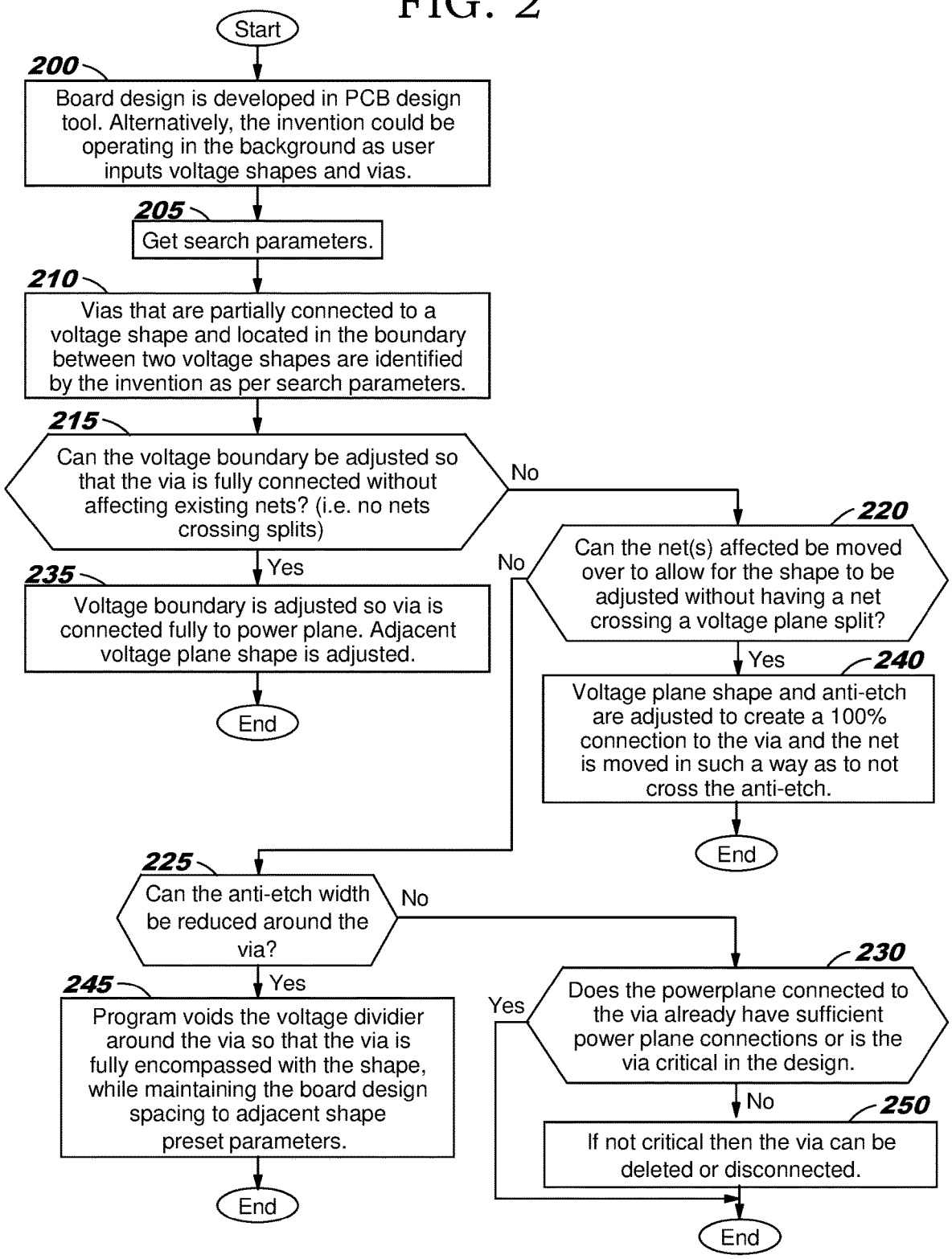
FIG. 2 provides a flowchart illustrating an approach to operation of an embodiment of the present invention.

FIG. 2 provides a flowchart illustrating an approach to operation of an embodiment of the present invention. An embodiment of the present invention leverages PCB layout information created by an existing PCB design tool (Block 200), performing an algorithmic evaluation of the PCB layout information that is directed to identifying and resolving through via placement issues (referred to equivalently herein as via layout issues).

In one embodiment, the algorithmic evaluation is performed after the designer (who is referred to herein equivalently as a "user" or "engineer") has completed a PCB design, or some portion thereof. In another embodiment, the algorithmic evaluation operates in a background mode during the PCB design as the designer is inputting various voltage shapes and vias. In these embodiments, a PCB design tool is augmented with code providing an implementation of the algorithmic evaluation or a call-out to such code. In yet another embodiment, the algorithmic evaluation is performed by an application that is embodied separately from the PCB design tool, whereby input to the algorithmic evaluator application uses layout information created from the PCB design tool.

An embodiment obtains search parameters for the algorithmic evaluation (Block 205), where these parameters indicate an area of the PCB layout to be analyzed, such that vias meeting the search parameters are evaluated for placement issues.

Figure 3:
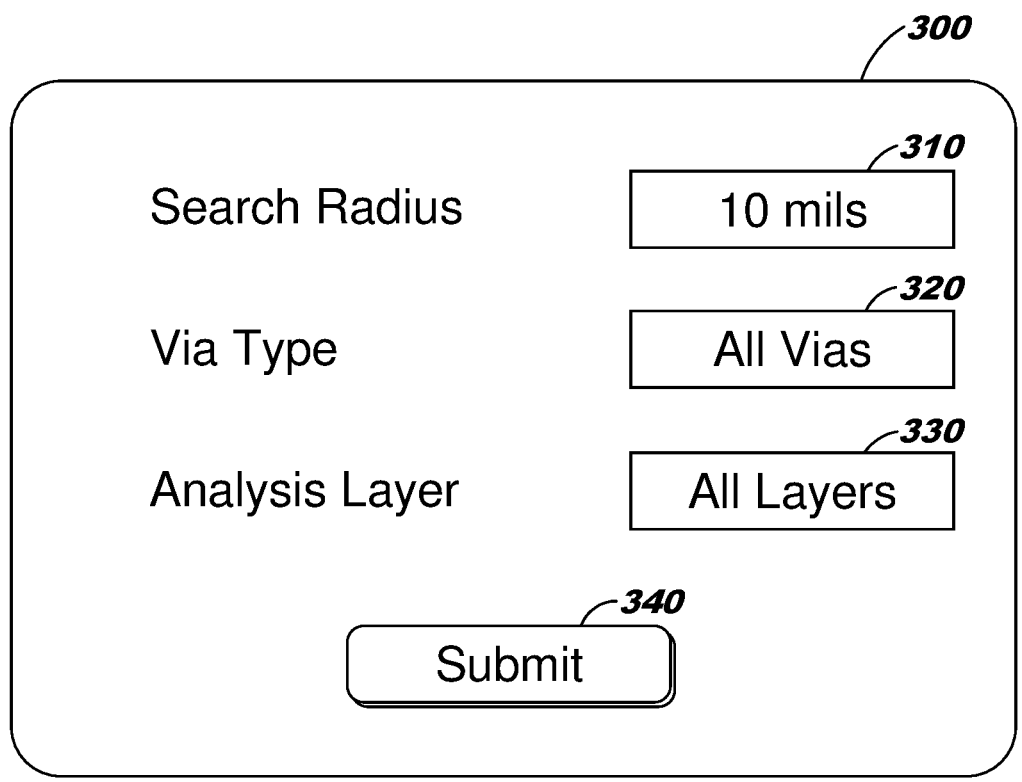
FIG. 3 depicts an example of a graphical user interface ("GUI") for presenting options to a user for evaluating vias in one or more of the layers of the PCB design, and for receiving the user's selections.

In an embodiment, selecting options to be used as search parameters at Block 205 is performed with a graphical user interface ("GUI"), whereby a user selects options for the search parameters. In another embodiment, the search parameters are obtained from another source, such as a previously-stored configuration file. FIG. 3 depicts an example of a GUI for presenting options to the user for evaluating vias in one or more of the layers of the PCB design, and for receiving the user's selections, as will now be discussed.

In the depicted example GUI 300, a first selection available to the user is to specify a search radius, as shown at entry field 310. In the example of FIG. 3, the user has entered "10 mils" as the search radius (where 1 mil corresponds to one thousandth of an inch). The search radius is measured from the center of a via, as discussed in further detail below with reference to Block 210. A second selection available to the user in the example GUI 300 is to specify a via type, as shown at entry field 320. In the example of FIG. 3, the user has entered "All Vias" as the via type for searching. Alternatively, the user might select to search only for a particular type of via, such as by selecting from a drop-down list (as an example) that includes choices of plated through via, buried via, and blind via. Vias of different physical size might also be identified and selected in this manner. A third selection available to the user in example GUI 300 is to specify an analysis layer, as shown at entry field 330. In the example of FIG. 3, the user has entered "All Layers" as the scope of the search. Alternatively, the user might select to search only within a particular layer or layers—noting that the layers are known to the PCB design tool, and that identifying information for the layers can therefore be obtained and used to populate a selection mechanism such as a drop-down list (as an example). Once the user has entered all of the search parameters, the user presses the "Submit" button 340 of the example GUI to invoke operation of the algorithmic evaluation. (As will be obvious, the algorithmic evaluation may be invoked in another manner—for example, by pressing another type of button, by pressing a predefined key sequence, by selecting an option from a drop-down menu, and so forth—without deviating from the scope of the present invention.)

When the algorithmic evaluator is embodied within a PCB design tool, displaying a GUI for input of search parameters may be invoked in various ways within such PCB design tool—for example, by selecting a choice from a menu, pressing a predefined key sequence, and so forth. While a background for the GUI 300 is not illustrated in FIG. 3, in an embodiment, a GUI for input of search parameters is superimposed upon a window of the PCB design tool, such window typically depicting at least some portion of the corresponding PCB design.

An embodiment of the present invention evaluates the data created by the PCB design tool to represent the physical design, according to the search parameters obtained at Block 205. Notably, nets and shapes are routed and present in the simulated physical design as created by the PCB design tool. An embodiment of the present invention performs an evaluation, for each individual layer as selected in the search parameters, that analyzes each individual via in that layer which has a via type of the type as selected in the search parameters. When a via-in-void issue is identified, an embodiment programmatically resolves that issue. An embodiment performs the programmatic resolution by selecting an appropriate resolution from a predetermined set of resolutions. Accordingly, the processing at Blocks 210-250 iterates for each selected layer to identify and resolve via-in-void issues, for each selected via type, and begins (Block 210) with identifying a particular layer's vias that are partially connected to a voltage shape and are also located in the boundary between two shapes.

Note that the above-mentioned iteration of Blocks 210-250 has not been depicted in FIG. 2 for drafting convenience, although it will be obvious to one of ordinary skill in the art how such iteration is performed—for example, by testing to see whether all selected via types within a layer have been evaluated and then, upon completion of evaluating a particular layer, by testing to see whether all selected layers have been evaluated.

Block 210 locates a via for evaluation. When evaluating vias in a layer, if the via is attached to a plane, an embodiment searches to see if a different power plane is present within the selected search radius. If the via falls on the edge of a power plane, but that edge is not near (i.e., within the selected radius of) another plane, then this via is not considered to be problematic. However, if the via falls on the edge of a power plane that is within the selected radius of another plane, then the evaluation algorithm identifies this as a via-in-void issue at Block 210, and subsequent processing of FIG. 2 attempts a resolution therefor.

Having found a via-in-void issue at Block 210, Block 215 tests whether the voltage boundary can be adjusted so that the via is fully connected to a power shape without affecting existing nets. As noted at Block 215, the adjustment should not result in nets crossing any voltage plane splits. (As is readily understood, a voltage plane "split" refers to a horizontal separation between multiple power planes of a PCB. A voltage plane split is a type of voltage boundary.) If this test has a positive result, then processing continues at Block 235, where the voltage boundary is adjusted by an embodiment so that the via is now fully connected to a power plane and the adjacent voltage plane shape is also adjusted.

Figure 4:
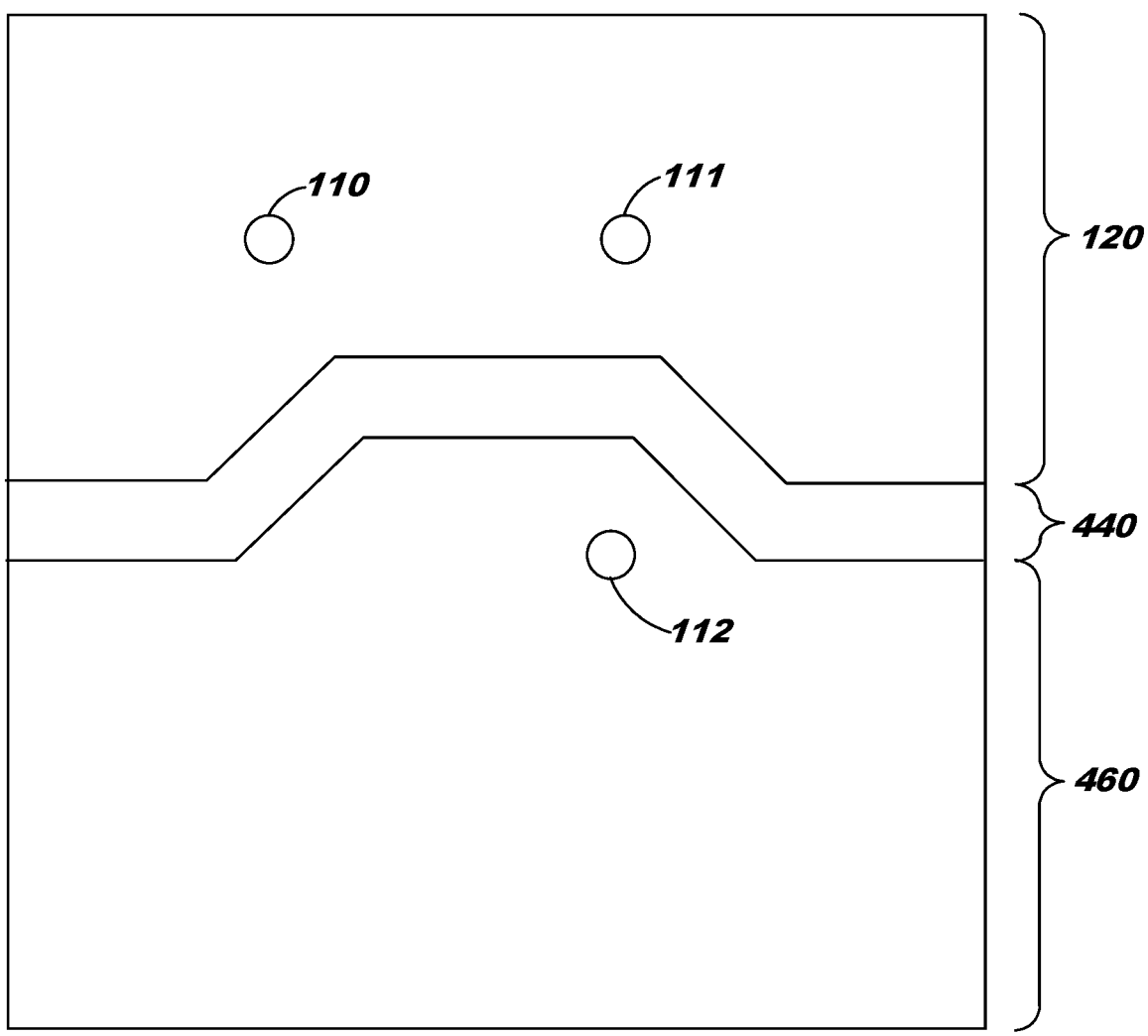
FIG. 4 illustrates a resolution for the placement issue depicted in FIG. 1.

FIG. 4 illustrates how the processing of Block 235 provides a resolution for the layout issue discussed above with reference to FIG. 1, where a via falls on the edge of one power plane and near an adjacent power plane. Block 235 adjusts the voltage boundary 140 of the example so that via 112 is fully encompassed within the voltage shape 160 to which it was previously only partially connected. Accordingly, as shown in FIG. 4, the shape of ground plane 160 of FIG. 1 is now changed as shown at 460, and the shape of void 140 of FIG. 1 is now changed as shown at 440. In this resolution, vias 110, 111 remain connected to a first net, while via 112 connects to a different net, with these nets being electrically isolated from each other by void 440. (Note that the areas denoted as 140, 440 are referred to herein as a void, and are an example of the type of divider region evaluated by an embodiment.)

While iteration is not shown in FIG. 2, as noted above, a next via on this layer is evaluated (if present) following completion of Block 235. Or, if the test at Block 215 has a negative result, then processing continues at Block 220 to continue evaluating the previously-located via placement issue.

Block 220 tests whether one or more nets affected by a via-in-void issue can be moved over to allow for the shape in which the via is located to be adjusted, where this moving of net(s) can be done without having the resulting net crossing a voltage plane split. If this test has a positive result, then processing continues at Block 240, where the voltage plane shape and anti-etch are adjusted by an embodiment so that the via is now fully connected to a power plane and the net is also moved in such a way that it does not cross the anti-etch. (As is readily understood, "anti-etch" refers to a shape within a PCB layout that indicates where copper is to be etched.)

Figure 5A:
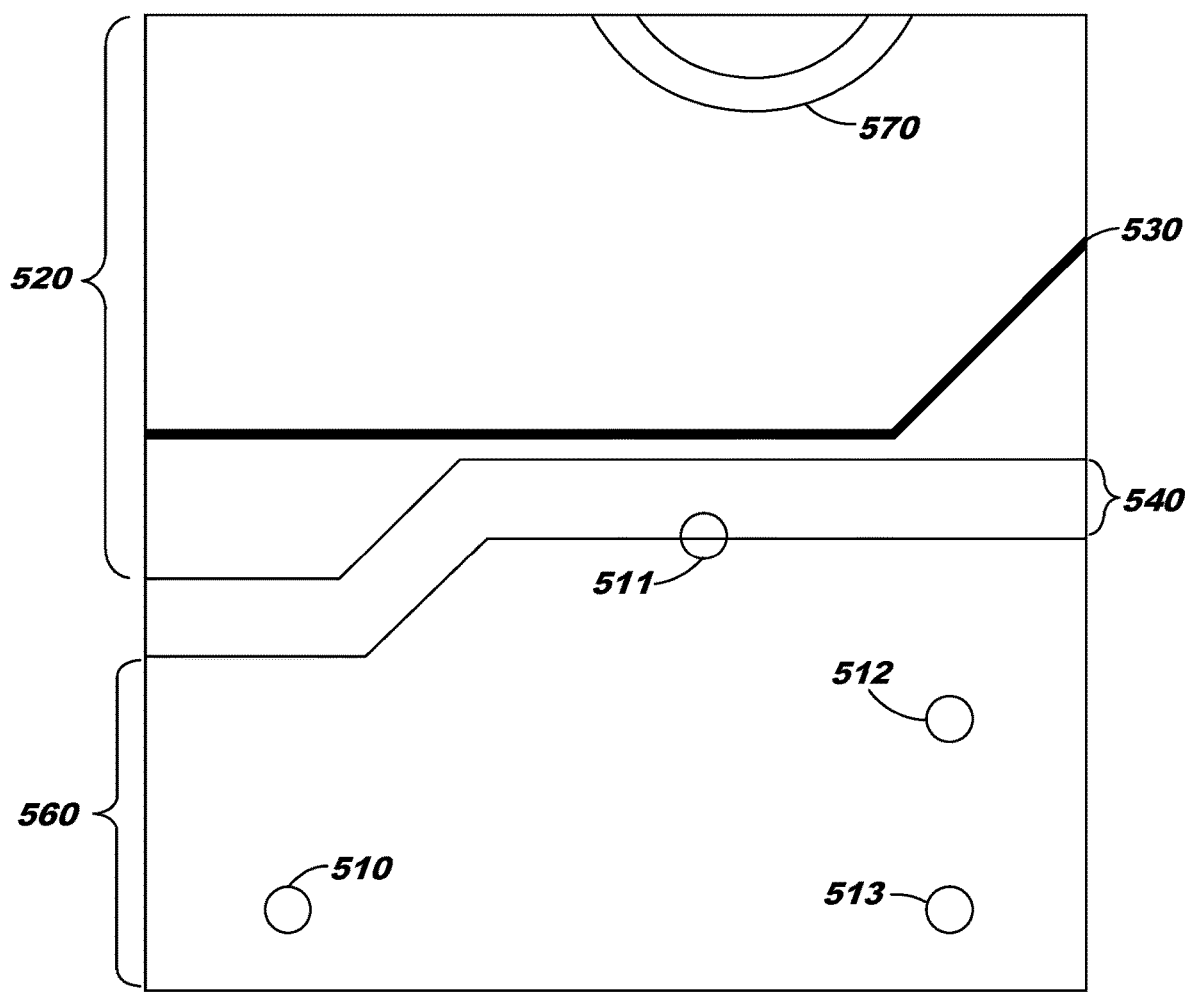
FIGS. 5A-5C illustrate identifying and resolving another placement issue.
Figure 5B:
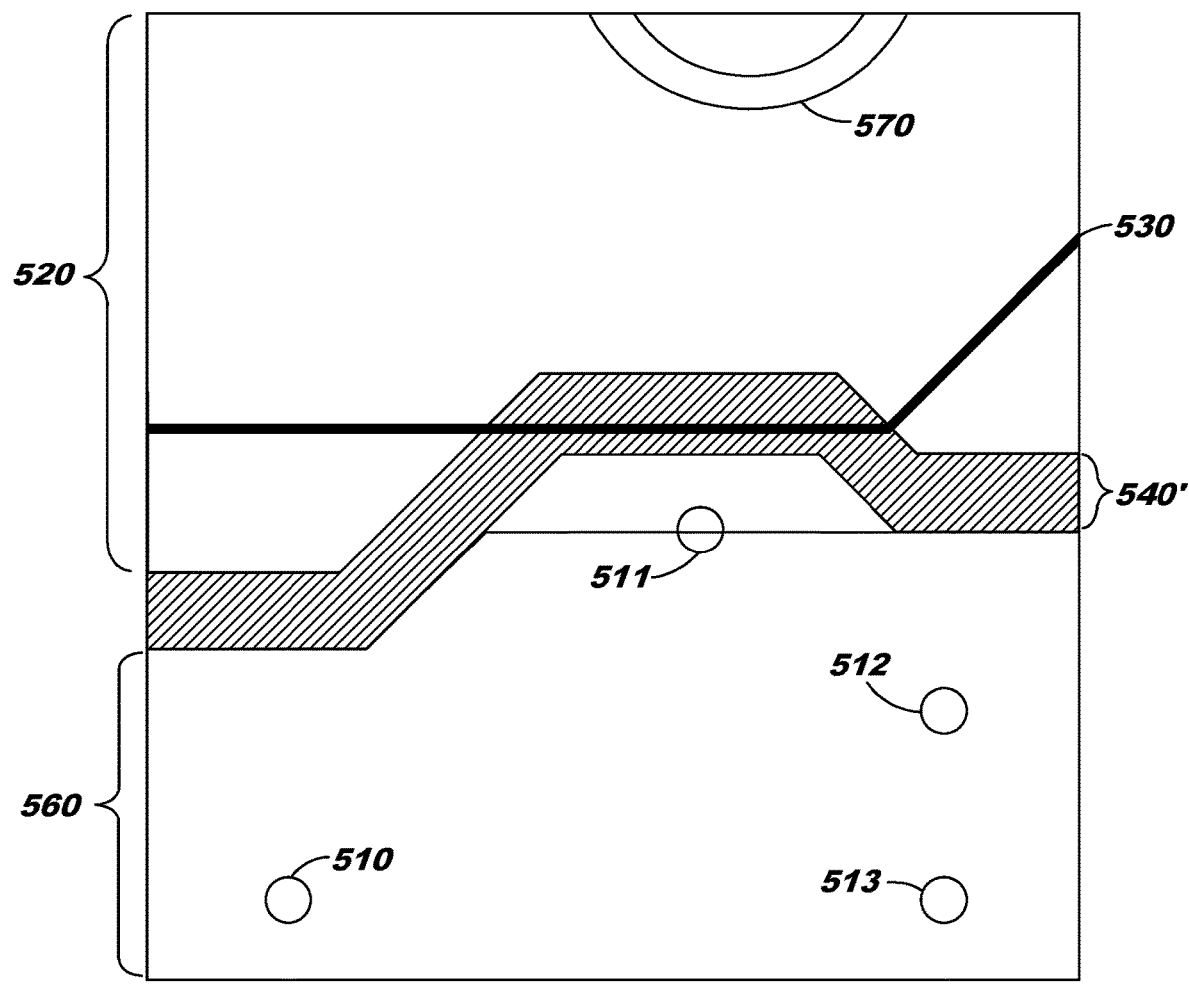
Figure 5C:
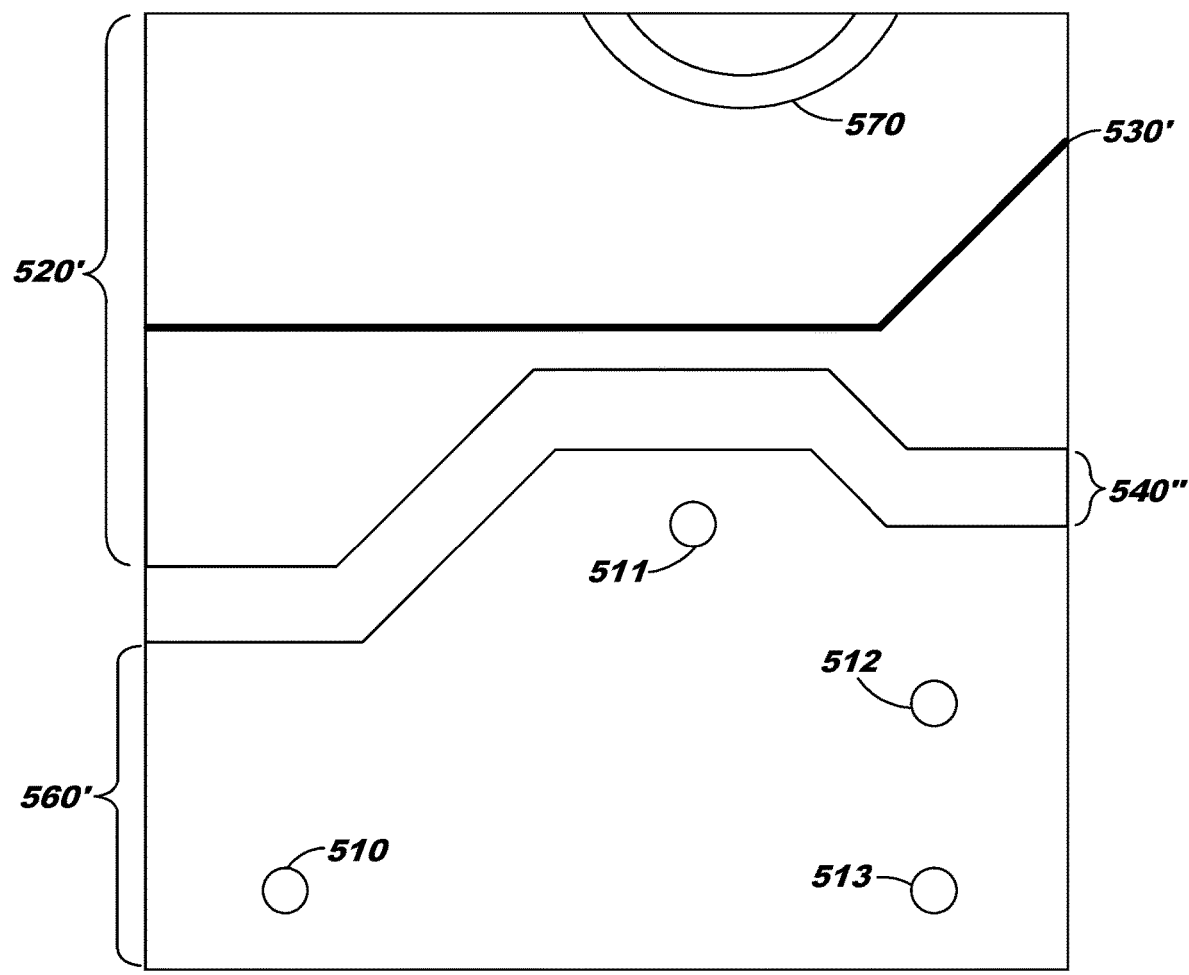

FIGS. 5A-5C illustrate identifying and resolving a placement issue according to Blocks 220 and 240. FIG. 5A shows an identified via-in-void issue, whereby via 511 is partially connected to voltage shape 560 and is located in boundary 540 between voltage shapes 520 and 560. In this example, it is presumed that voltage shape 520 is a power shape having some voltage and shape 560 is a ground shape, both of which are located on a particular layer of a PCB. Reference number 530 depicts a net that exists on an adjacent (different) layer of the PCB. Boundary 540 is a void or anti-etch region, in this example, and shape 570 denotes another component such as a tooling hole.

In this example, the test in Block 215 has a negative result because existing nets will be affected if the resolution is only to move the voltage boundary, while the test in Block 220 has a positive result. Accordingly, the processing performed in an embodiment at Block 240 is illustrated by FIGS. 5B and 5C. In FIG. 5B, an embodiment routes the anti-etch 540 out of the way (with the new shape thereof shown in the figure by hashing) so that the via 511 can be fully connected to ground shape 560. The adjustment as shown in FIG. 5B therefore depicts a revised anti-etch 540' as in interim step, which now is shown to align with (i.e., to overlay) placement of net 530 on the adjacent layer, which is undesirable. Accordingly, FIG. 5C depicts a final result of the resolution performed in an embodiment at Block 240, whereby net 530 is now moved closer (in this example) to the position of tooling hole 570 and is thus shown as net 530'. In addition, anti-etch 540' is now shown as adjusted anti-etch 540" in FIG. 5C, and ground shape 560 is now shown as adjusted ground shape 560'. Notably, via 511 is now fully connected to the power plane represented by ground shape 560', and the net 530' does not cross the anti-etch 540".

While iteration is not shown in FIG. 2, as noted above, a next via on this layer is evaluated (if present) following completion of Block 240. Or, if the test at Block 220 has a negative result, then processing continues at Block 225 to continue evaluating the previously-located via placement issue.

Block 225 tests whether the width of anti-etch in which the via is located can be reduced around the via to resolve the via placement issue. If this test has a positive result, then processing continues at Block 245, where an embodiment voids the voltage divider around the via—that is, increases the width of the anti-etch—so that the via is now fully encompassed within that shape. As noted in Block 245, the spacing of adjacent shapes in the PCB design is maintained according to preset parameters (which, in an embodiment, are retrieved from a configuration file or other location) during this operation.

Figure 6A:
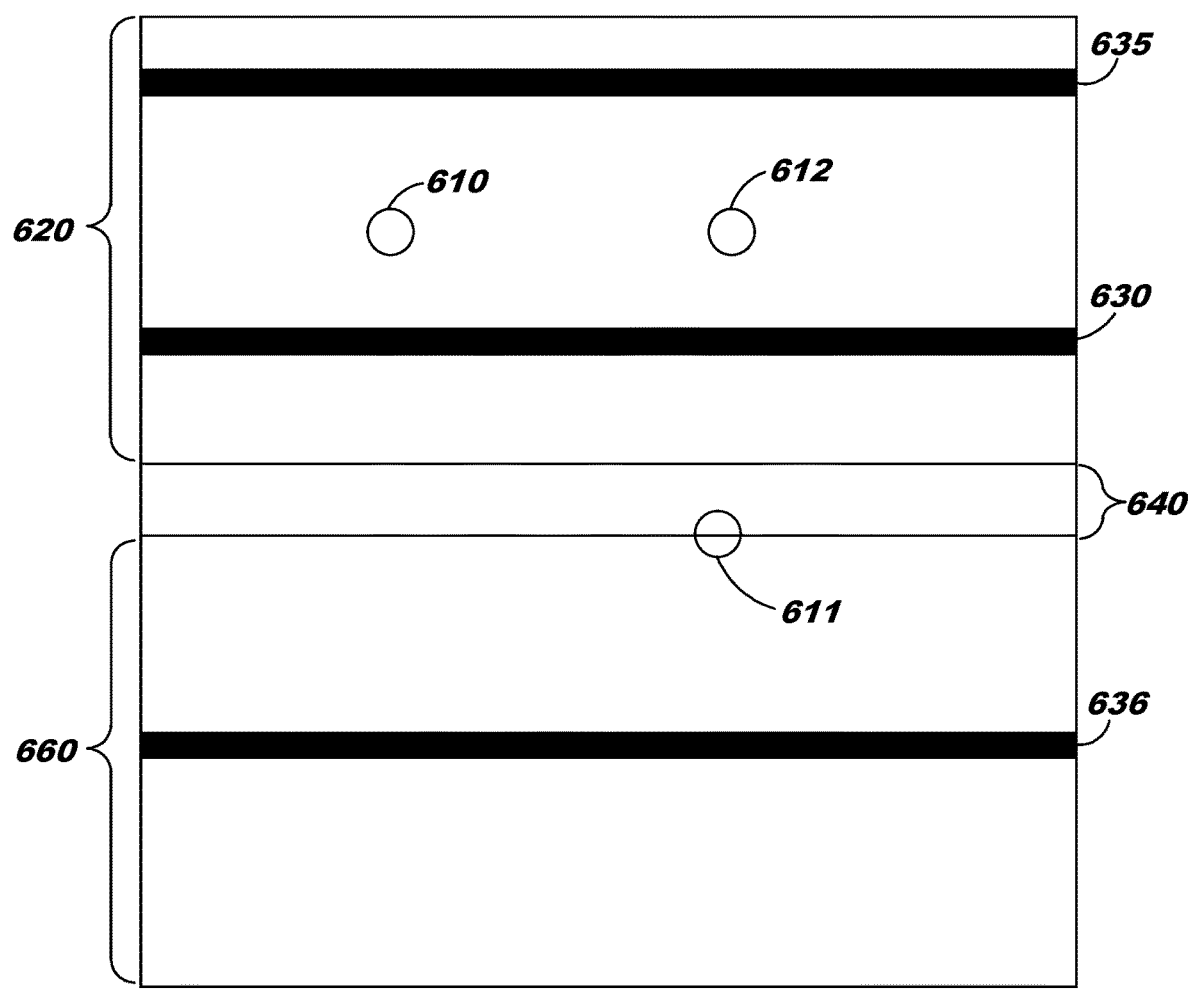
FIGS. 6A-6B illustrate identifying and resolving a different placement issue.
Figure 6B:
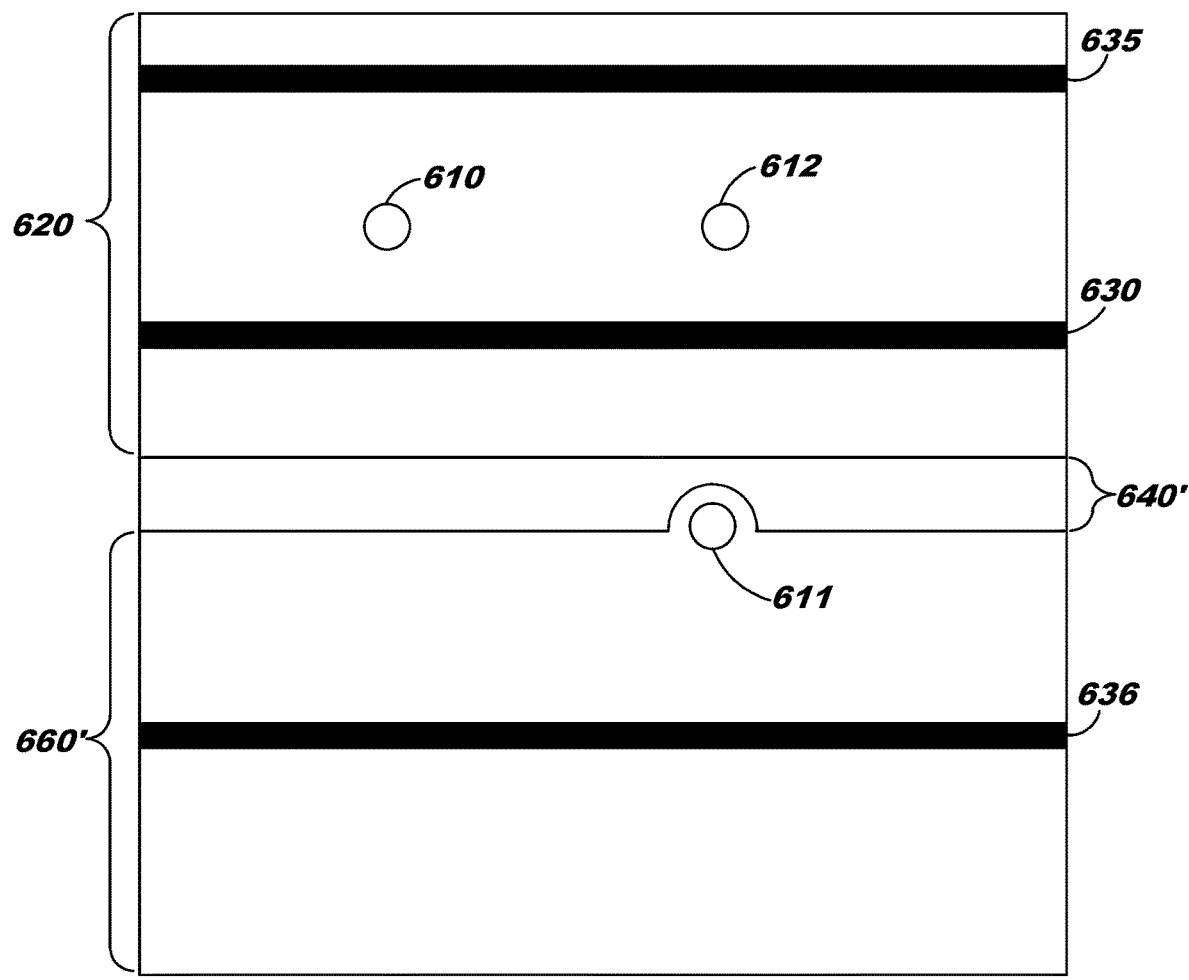

FIGS. 6A-6B illustrate identifying and resolving a placement issue according to Blocks 225 and 245. FIG. 6A shows an identified via-in-void issue, whereby via 611 is partially connected to voltage shape 660 and is located in boundary 640 between voltage shapes 620 and 660. In this example, it is presumed that voltage shape 620 is a power shape and shape 660 is a ground shape, both of which are located on a particular layer of a PCB. Reference numbers 630, 635, 636 each depict a net that exists on an adjacent (different) layer of the PCB. Boundary 640 is an anti-etch region, in this example.

In this example, the test in Block 225 has a negative result because moving anti-etch region 640 in the direction of vias 610, 612 would result in a signal/impedance on the adjacent layer crossing the divider region (i.e., the divider region would cross over net 630), while the test in Block 225 has a positive result. Accordingly, the processing performed in an embodiment at Block 245 is illustrated by FIG. 6B. In FIG. 6B, an embodiment voids a portion of the voltage divider region 640 around via 611 (which has effect of reducing the width of the anti-etch in this portion), as shown by adjusted divider region 640', so that copper can now completely surround the hole of via 611 and thus fully connect via 611 to adjusted ground shape 660'.

While iteration is not shown in FIG. 2, as noted above, a next via on this layer is evaluated (if present) following completion of Block 245. Or, if the test at Block 225 has a negative result, then processing continues at Block 230 to continue evaluating the previously-located via placement issue.

Upon reaching Block 230, it is known that the resolutions performed at Block 235, 240, and 245 are not suitable. Block 230 then tests whether the via is critical to the design or if the power plane connected to the via already has sufficient power plane connections. In an embodiment, determining whether a via is critical to a design uses an analysis of the shape, including whether sufficient margins exist for disconnecting the via from the shape. If the test at Block 230 has a positive result, then the evaluation of this via is complete; otherwise, processing continues at Block 250, where an embodiment either deletes the via from the PCB design or disconnects it from the power plane on the layer where the via-in-void violation occurs. In the case of disconnection, the via remains in place for connection to a different power plane on another layer, and an embodiment places void on both sides of the via.

Figure 7A:
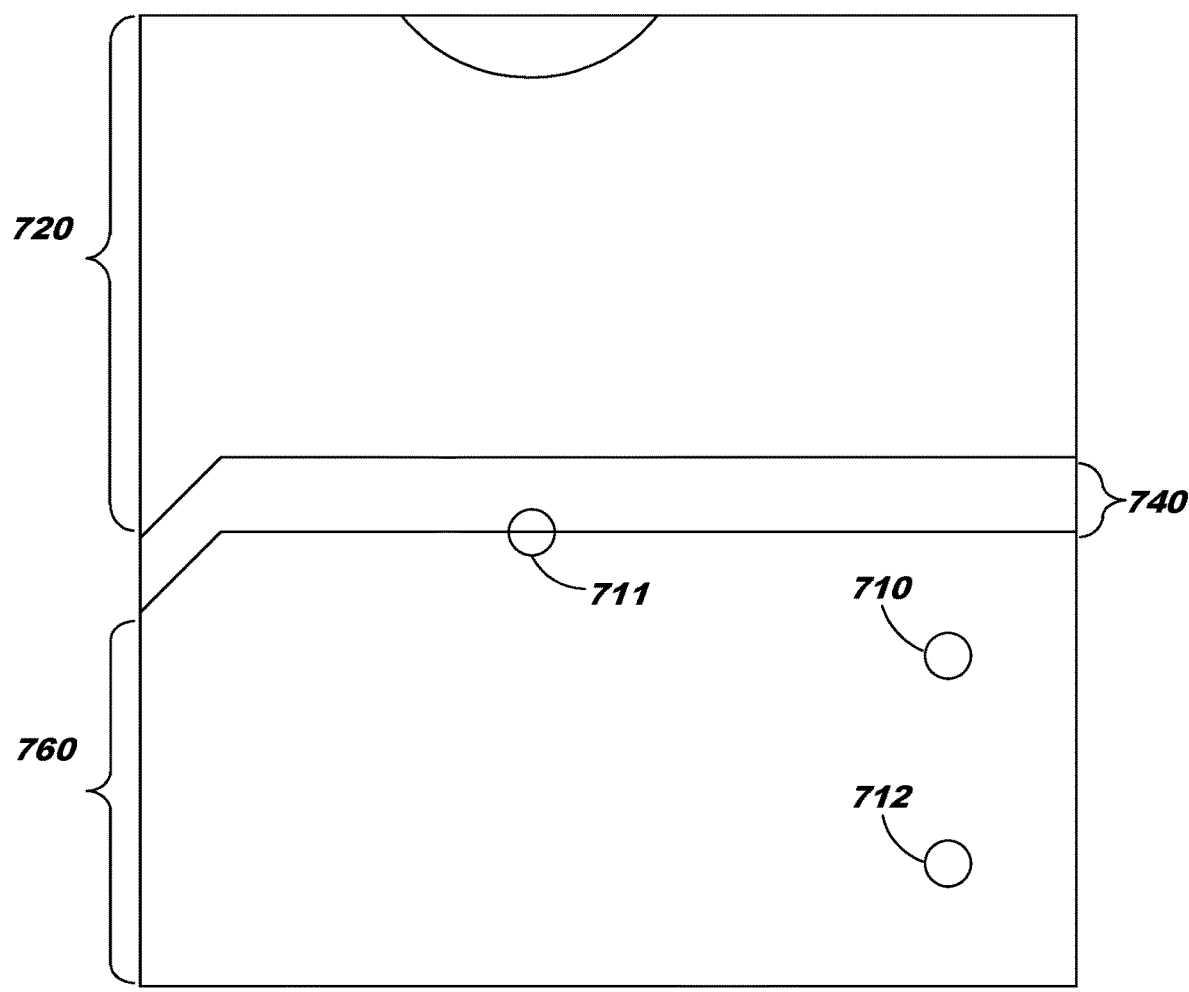
FIGS. 7A-7B illustrate identifying and resolving yet another placement issue.
Figure 7B:
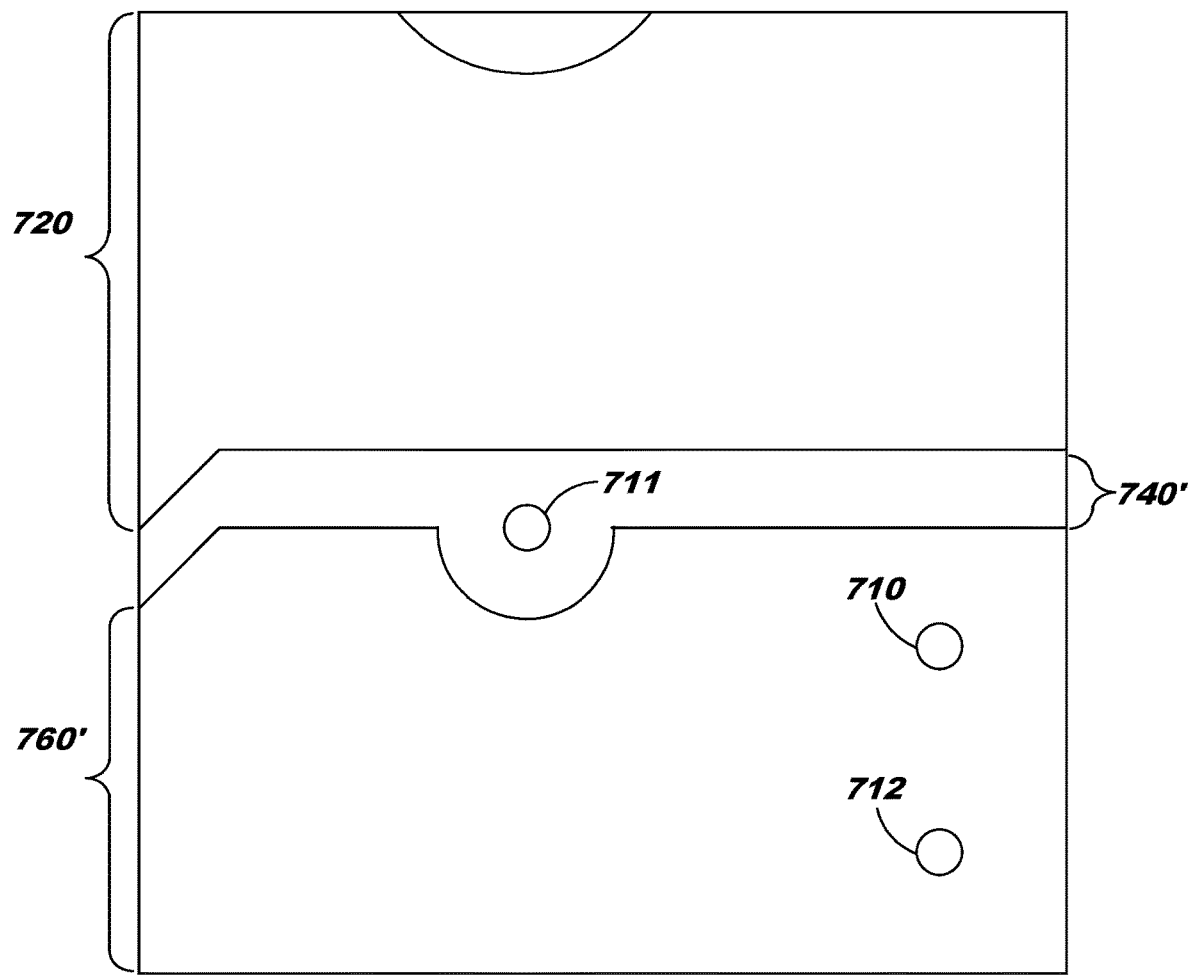

FIGS. 7A-7B illustrate identifying and resolving a placement issue according to Blocks 230 and 250, using the disconnection approach to resolution. FIG. 7A shows an identified via-in-void issue, whereby via 711 is partially connected to voltage shape 760 and is located in boundary 740 between voltage shapes 720 and 760. In this example, it is presumed that voltage shape 720 is a power shape and shape 760 is a ground shape, both of which are located on a particular layer of a PCB. Boundary 740 is an anti-etch region, in this example.

The processing performed in an embodiment at Block 250 is illustrated by FIG. 7B. In FIG. 7B, an embodiment voids an upper portion of the voltage shape 760 around via 711 (which has effect of surrounding via 711 with anti-etch), as shown by adjusted divider region 740' and adjusted ground shape 760'.

When the test in Block 230 has a positive result, and following the processing of Block 250, a next via on this layer is evaluated (if present) by iterating the above-described processing for an identified via-in-void condition. And as noted, when all vias of a currently-evaluated layer have been processed in this manner, a next layer of this PCB (if another layer is selected) is processed to identify and resolve via-in-void issues.

Notably, as each above-described issue resolution completes, the PCB layout information is updated with the as-resolved information (e.g., the modified shape). Once the identifying and resolving of via-in-void issues completes for each selected via type and each selected layer, according to the disclosed approach, a final version of the PCB layout information (recorded in Gerber data, for example) is stored and is available for sending to a PCB fabrication process.

As has been demonstrated, embodiments of the present invention provide automated identification and resolution of via-in-void issues, without requiring a designer to manually attempt these tasks. Accordingly, project costs are decreased. Because an automated resolution is provided, as described herein, potential for introducing additional problems due to human error in manually reworking a complex PCB design for the described via placement issues is avoided. In addition, project delays are decreased, and project quality is increased, by sending a PCB design to fabrication only after the via-in-void issues are resolved as has been described.

Figure 8:
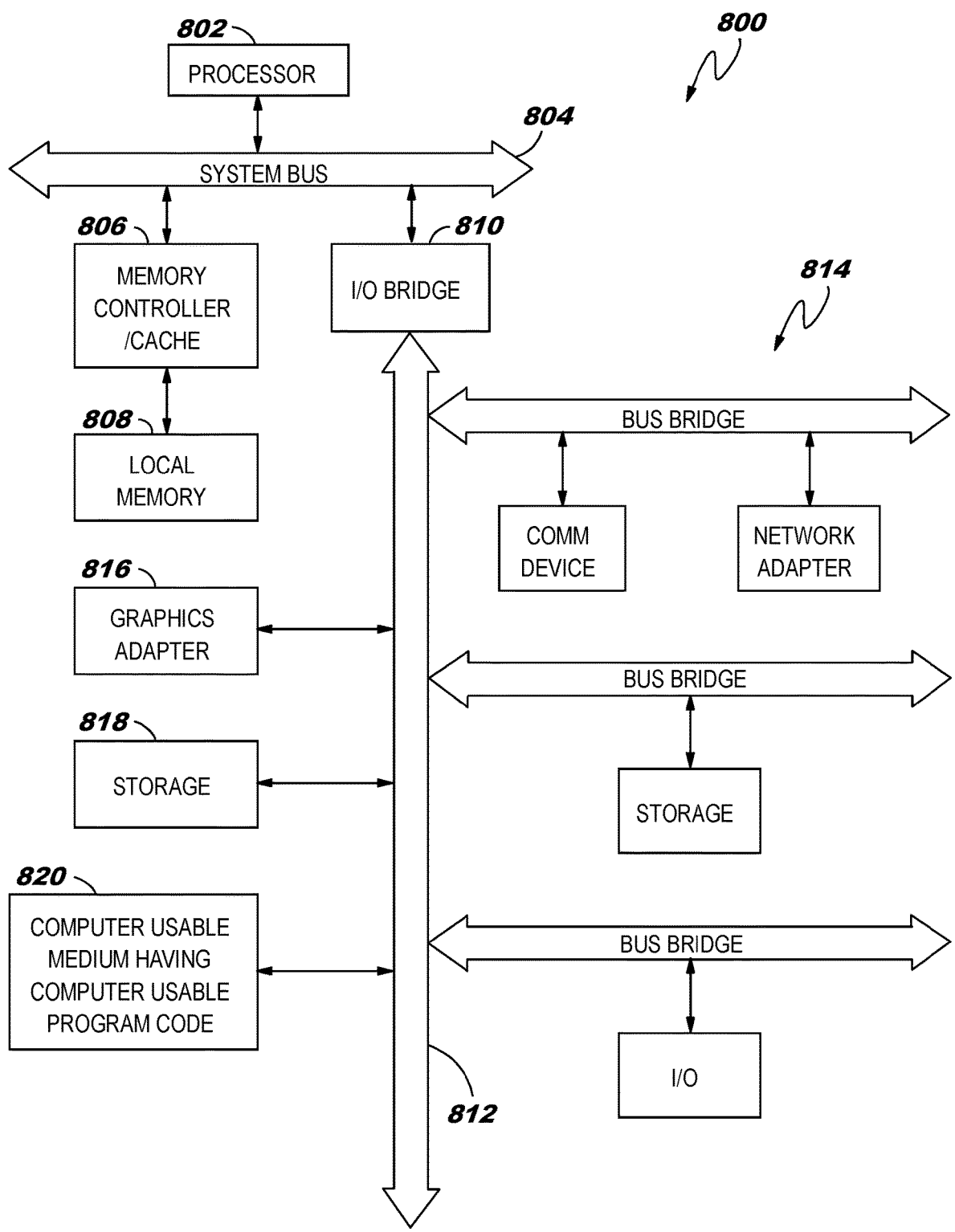
FIG. 8 depicts a block diagram of a data processing system in accordance with an embodiment of the present invention.

Referring now to FIG. 8, a block diagram of a data processing system is depicted in accordance with an embodiment of the present invention. Data processing system 800 comprises a processor 802 connected to a system bus 804. Also connected to system bus 804 is memory controller/cache 806, which provides an interface to local memory 808. An input/output ("I/O") bridge 810 is connected to the system bus 804 and provides an interface to an I/O bus 812. The I/O bus may be utilized to support one or more buses 814 and corresponding devices, such as bus bridges, I/O devices, storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 816, storage 818, and a computer usable storage medium 820 having computer usable program code embodied thereon. The computer usable program code may be executed to execute any aspect of the present invention, as described herein.

Figure 9:
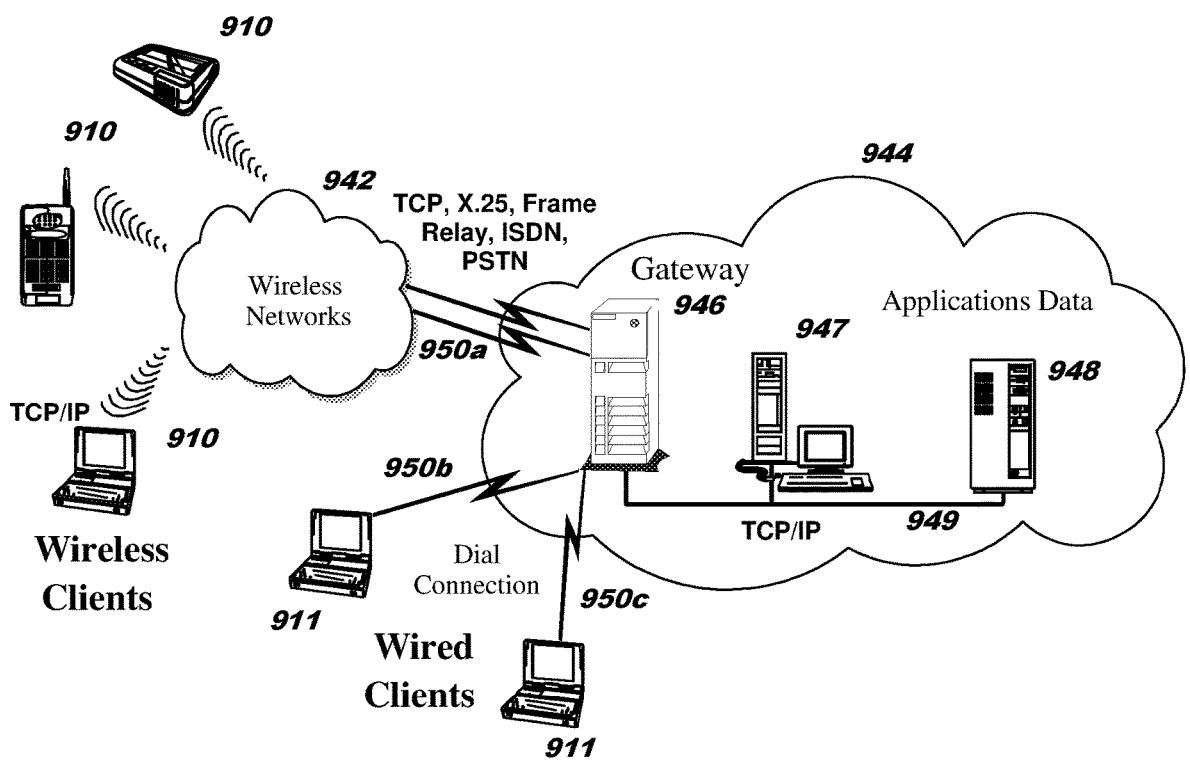
FIG. 9 depicts a representative networking environment in which one or more embodiments of the present invention may be used.

FIG. 9 illustrates a data processing network environment 900 in which the present invention may be practiced. The data processing network 900 may include a plurality of individual networks, such as wireless network 942 and wired network 944. A plurality of wireless devices 910 may communicate over wireless network 942, and a plurality of wired devices, shown in the figure (by way of illustration) as workstations 911, may communicate over network 944. Additionally, as those skilled in the art will appreciate, one or more local area networks ("LANs") may be included (not shown), where a LAN may comprise a plurality of devices coupled to a host processor.

Still referring to FIG. 9, the networks 942 and 944 may also include mainframe computers or servers, such as a gateway computer 946 or application server 947 (which may access a data repository 948). A gateway computer 946 serves as a point of entry into each network, such as network 944. The gateway 946 may be preferably coupled to another network 942 by means of a communications link 950a. The gateway 946 may also be directly coupled to one or more workstations 911 using a communications link 950b, 950c, and/or may be indirectly coupled to such devices. The gateway computer 946 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 946 may also be coupled 949 to a storage device (such as data repository 948).

Those skilled in the art will appreciate that the gateway computer 946 may be located a great geographic distance from the network 942, and similarly, the workstations 911 may be located some distance from the networks 942 and 944, respectively. For example, the network 942 may be located in California, while the gateway 946 may be located in Texas, and one or more of the workstations 911 may be located in Florida. The workstations 911 may connect to the wireless network 942 using a networking protocol such as the Transmission Control Protocol/Internet Protocol ("TCP/

IP") over a number of alternative connection media, such as cellular phone, radio frequency networks, satellite networks, etc. The wireless network 942 preferably connects to the gateway 946 using a network connection 950*a* such as TCP or User Datagram Protocol ("UDP") over IP, X.25, Frame Relay, Integrated Services Digital Network ("ISDN"), Public Switched Telephone Network ("PSTN"), etc. The workstations 911 may connect directly to the gateway 946 using dial connections 950*b* or 950*c*. Further, the wireless network 942 and network 944 may connect to one or more other networks (not shown), in an analogous manner to that depicted in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method, comprising:
   obtaining search parameters for identifying via placement issues in a printed circuit board (APCB@) layout;
   identifying one or more via placement issues in the PCB layout, according to the obtained search parameters;
   resolving each of the one or more identified via placement issues, using a resolution selected from a predetermined set of resolutions; and
   revising the PCB layout to store an updated PCB layout in which the one or more identified via placement issues are resolved;
   wherein identifying one or more via placement issues in the PCB layout further comprises, for a particular via, determining that the particular via is partially connected to a voltage shape in the PCB layout and is located in a voltage boundary between the voltage shape and another voltage shape.

2. The computer-implemented method according to claim 1, wherein the search parameters comprise a search radius, a via type, and an analysis layer.

3. The computer-implemented method according to claim 1, wherein the computer-implemented method is embodied within a PCB design tool and is invoked upon completing a design, with the PCB design tool, of at least a portion of the PCB layout.

4. The computer-implemented method according to claim 1, wherein the computer-implemented method is embodied as an application separate from, and is invoked, from the PCB design tool.

5. The computer-implemented method according to claim 1, wherein:
   resolving the identified via placement issue for the particular via comprises:
      determining whether the voltage boundary can be adjusted without causing any net of the PCB layout to cross the voltage boundary, and if so, then selecting, as the resolution, an adjusting of the voltage boundary to fully connect the particular via to the voltage shape and an adjusting of the voltage shape; and
   revising the PCB layout to store the updated PCB layout comprises storing the adjusted voltage boundary and the adjusted voltage shape.

6. The computer-implemented method according to claim 1, wherein:
   resolving the identified via placement issue for the particular via comprises:
      determining that the voltage boundary cannot be adjusted without causing any net of the PCB layout to cross a voltage boundary, but that a particular one of the any net can be moved without causing the particular net to cross the voltage boundary, and then selecting, as the resolution, a moving of the particular net to a different location that does not cross the voltage boundary, an adjusting of the voltage shape, and an adjusting of the voltage boundary to fully connect the particular via to the voltage shape; and
   revising the PCB layout to store the updated PCB layout comprises storing the different location of the particular net, the adjusted voltage shape, and the adjusted voltage boundary.

7. The computer-implemented method according to claim 1, wherein:
   resolving the identified via placement issue for the particular via comprises:
      determining that the voltage boundary cannot be adjusted without causing any of one or more net of the PCB layout to cross a voltage boundary and that at least a particular one of the one or more net cannot be moved without causing the particular net to cross the voltage boundary, but that a width of the voltage boundary can be reduced around the particular via, and then selecting, as the resolution, a voiding of the voltage boundary around the particular via that causes the particular via to be fully connected to the voltage shape; and
   revising the PCB layout to store the updated PCB layout comprises storing a representation of the voltage boundary that reflects the voiding.

8. The computer-implemented method according to claim 1, wherein:
   resolving the identified via placement issue for the particular via comprises:
      determining that the voltage boundary cannot be adjusted without causing any of one or more net of the PCB layout to cross a voltage boundary and that at least a particular one of the one or more net cannot be moved without causing the particular net to cross the voltage boundary and that a width of the voltage boundary cannot be reduced around the particular via, and that the particular via is not critical to the PCB layout and then selecting, as the resolution, a deletion of the particular via from the PCB layout; and
   revising the PCB layout to store the updated PCB layout comprises omitting a representation of the particular via from the PCB layout.

9. The computer-implemented method according to claim 1, wherein:
   resolving the identified via placement issue for the particular via comprises:
      determining that the voltage boundary cannot be adjusted without causing any of one or more net of the PCB layout to cross a voltage boundary and that at least a particular one of the one or more net cannot be moved without causing the particular net to cross the voltage boundary and that a width of the voltage boundary cannot be reduced around the particular via, and that the particular via is not critical to the PCB layout and then selecting, as the resolution, a disconnecting of the particular via from a layer of the PCB layout on which the particular via is located; and
   revising the PCB layout to store the updated PCB layout comprises reflecting the particular via as disconnected from the layer.

10. The computer-implemented method according to claim 1, wherein the predetermined set of resolutions comprises:
   determining whether the voltage boundary can be adjusted without causing any net of the PCB layout to cross the voltage boundary, and if so, then selecting, as the resolution, an adjusting of the voltage boundary to fully connect a particular via identified as having a placement issue to the voltage shape and an adjusting of the voltage shape;

determining that the voltage boundary cannot be adjusted without causing any net of the PCB layout to cross a voltage boundary, but that a particular one of the any net can be moved without causing the particular net to cross the voltage boundary, and then selecting, as the resolution, a moving of the particular net to a different location that does not cross the voltage boundary, an adjusting of the voltage shape, and an adjusting of the voltage boundary to fully connect the particular via to the voltage shape;

determining that the voltage boundary cannot be adjusted without causing any of one or more net of the PCB layout to cross a voltage boundary and that at least a particular one of the one or more net cannot be moved without causing the particular net to cross the voltage boundary, but that a width of the voltage boundary can be reduced around the particular via, and then selecting, as the resolution, a voiding of the voltage boundary around the particular via that causes the particular via to be fully connected to the voltage shape; and determining that the voltage boundary cannot be adjusted without causing any of one or more net of the PCB layout to cross a voltage boundary and that at least a particular one of the one or more net cannot be moved without causing the particular net to cross the voltage boundary and that a width of the voltage boundary cannot be reduced around the particular via, and that the particular via is not critical to the PCB layout and then selecting, as the resolution, a deletion of the particular via from the PCB layout or a disconnecting of the particular via from a layer of the PCB layout on which the particular via is located.

11. The computer-implemented method according to claim 1, wherein the updated PCB layout is usable for fabrication of a physical PCB.

12. A system comprising:
a printed circuit board (APCB@) layout specification;
a computer comprising a processor; and
instructions which are executable, using the processor, to perform functions comprising:
obtaining search parameters for identifying via placement issues in the PCB layout specification;
identifying one or more via placement issues in the PCB layout specification, according to the obtained search parameters;
resolving each of the one or more identified via placement issues, using a resolution selected from a predetermined set of resolutions; and
revising the PCB layout specification to store an updated PCB layout specification in which the one or more identified via placement issues are resolved;

wherein identifying one or more via placement issues in the PCB layout specification further comprises, for a particular via, determining that the particular via is partially connected to a voltage shape in the PCB layout specification and is located in a voltage boundary between the voltage shape and another voltage shape.

13. The system according to claim 12, wherein the search parameters comprise a search radius, a via type, and an analysis layer.

14. The system according to claim 13, wherein the radius is used, by the resolving, to determine whether a particular resolution from the set is appropriate.

15. The system according to claim 14, wherein the radius specifies a distance from a center of a particular via that is identified as having a placement issue.

16. A computer program product comprising:
a non-transitory computer-readable storage medium having computer readable program code embodied therein, the computer-readable program code, when executed by a processor, causes the processor to perform a method comprising:
obtaining search parameters for identifying via placement issues in a printed circuit board (APCB@) layout;
identifying one or more via placement issues in the PCB layout, according to the obtained search parameters;
resolving each of the one or more identified via placement issues, using a resolution selected from a predetermined set of resolutions; and
revising the PCB layout to store an updated PCB layout in which the one or more identified via placement issues are resolved;
wherein identifying one or more via placement issues in the PCB layout further comprises, for a particular via, determining that the particular via is partially connected to a voltage shape in the PCB layout and is located in a voltage boundary between the voltage shape and another voltage shape.

17. The computer program product according to claim 16, wherein the search parameters comprise a via type and an analysis layer.

18. The computer program product according to claim 17, wherein the computer-readable program code is further configured for iteratively performing the identifying, the resolving, and the revising for each of one or more layers specified by the analysis layer.

19. The computer program product according to claim 16, wherein values for the search parameters are obtained from a user.

* * * * *